US012579393B2

(12) United States Patent
Sei

(10) Patent No.: US 12,579,393 B2
(45) Date of Patent: Mar. 17, 2026

(54) IMAGE FORMING APPARATUS AND SERVER

(71) Applicant: Toshiba Tec Kabushiki Kaisha, Tokyo (JP)

(72) Inventor: Masaaki Sei, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 36 days.

(21) Appl. No.: 18/603,747

(22) Filed: Mar. 13, 2024

(65) Prior Publication Data

US 2024/0428034 A1     Dec. 26, 2024

(30) Foreign Application Priority Data

Jun. 22, 2023     (JP) ................................. 2023-102871

(51) Int. Cl.
*G06K 17/00*          (2006.01)
*H04N 1/00*          (2006.01)

(52) U.S. Cl.
CPC ..... *G06K 17/0025* (2013.01); *H04N 1/00342* (2013.01); *H04N 1/00588* (2013.01)

(58) Field of Classification Search
CPC ........... G06K 17/0025; H04N 1/00342; H04N 1/0057; H04N 1/00588; B41J 3/50
See application file for complete search history.

(56) References Cited

U.S. PATENT DOCUMENTS

| | | | | |
|---|---|---|---|---|
| 9,063,453 | B2 * | 6/2015 | Azami | ................. G03G 15/234 |
| 2007/0139711 | A1 | 6/2007 | Miyata | |
| 2009/0244586 | A1 * | 10/2009 | Sei | ..................... H04N 1/00795 |
| | | | | 358/1.15 |

FOREIGN PATENT DOCUMENTS

| | | |
|---|---|---|
| JP | 2004139465 A | 5/2004 |
| JP | 2006326934 A | 12/2006 |
| JP | 2008080710 A | 4/2008 |

* cited by examiner

*Primary Examiner* — Thien M Le
*Assistant Examiner* — April A Taylor
(74) *Attorney, Agent, or Firm* — Kim & Stewart LLP

(57)          ABSTRACT

According to one embodiment, an image forming apparatus includes a tag communication unit configured to communicate with wireless tags, an image forming unit configured to form image on media carrying wireless tags, and a processor. The processor is configured to permit the image forming unit to form an image on a medium when the tag communication unit successfully writes data to a wireless tag carried by the medium, and indicate the image formed on the medium by the image forming unit is a use charge target after the image forming unit is permitted to form the image on the medium.

20 Claims, 10 Drawing Sheets

| MEMORY BANK | NAME | CONTENT |
|---|---|---|
| 00 | Reserved | KILL PASSWORD AND ACCESS PASSWORD ARE INCLUDED |
| 01 | EPC | EPC (ELECTRICAL PRODUCT CODE) IS INCLUDED |
| 02 | TID | TAG MANUFACTURER INFORMATION, MODEL INFORMATION, AND SERIAL NUMBER ARE INCLUDED |
| 03 | User | USER-SPECIFIC DATA CAN BE STORED |

FIG. 12

| TYPE OF PROCESS | TYPE OF COLOR | DATA WRITING | INCREASE AMOUNT OF CHARGING COUNT | CHARGING AMOUNT PER PAGE FOR ONE SHEET |
|---|---|---|---|---|
| PRINTING PROCESS | COLOR | - | 4 | ¥20 |
| PRINTING PROCESS | MONOCHROMIC | - | 2 | ¥10 |
| WIRELESS TAG WRITING PROCESS | NO | SUCCESS | 1 | ¥5 |
| WIRELESS TAG WRITING PROCESS | NO | FAILURE | 0 | ¥0 |
| WIRELESS TAG WRITING AND PRINTING PROCESS | COLOR | SUCCESS | 5 | ¥25 |
| WIRELESS TAG WRITING AND PRINTING PROCESS | COLOR | FAILURE | 0 | ¥0 |
| WIRELESS TAG WRITING AND PRINTING PROCESS | MONOCHROMIC | SUCCESS | 3 | ¥15 |
| WIRELESS TAG WRITING AND PRINTING PROCESS | MONOCHROMIC | FAILURE | 0 | ¥0 |

FIG. 13

| TYPE OF PROCESS | TYPE OF COLOR | PRINTING SUCCESS OR FAILURE | DATA WRITING | INCREASE AMOUNT OF CHARGING COUNT | CHARGING AMOUNT PER PAGE FOR ONE SHEET |
|---|---|---|---|---|---|
| PRINTING PROCESS | COLOR | NORMAL | - | 4 | ¥20 |
| PRINTING PROCESS | COLOR | ERROR | - | 0 | ¥0 |
| PRINTING PROCESS | MONOCHROMIC | NORMAL | - | 2 | ¥10 |
| PRINTING PROCESS | MONOCHROMIC | ERROR | - | 0 | ¥0 |
| WIRELESS TAG WRITING PROCESS | NO | - | SUCCESS | 1 | ¥5 |
| WIRELESS TAG WRITING PROCESS | NO | - | FAILURE | 0 | ¥0 |
| WIRELESS TAG WRITING AND PRINTING PROCESS | COLOR | NORMAL | SUCCESS | 5 | ¥25 |
| WIRELESS TAG WRITING AND PRINTING PROCESS | COLOR | NORMAL | FAILURE | 4 | ¥20 |
| WIRELESS TAG WRITING AND PRINTING PROCESS | COLOR | ERROR | SUCCESS | 1 | ¥5 |
| WIRELESS TAG WRITING AND PRINTING PROCESS | COLOR | ERROR | FAILURE | 0 | ¥0 |
| WIRELESS TAG WRITING AND PRINTING PROCESS | MONOCHROMIC | NORMAL | SUCCESS | 3 | ¥15 |
| WIRELESS TAG WRITING AND PRINTING PROCESS | MONOCHROMIC | NORMAL | FAILURE | 2 | ¥10 |
| WIRELESS TAG WRITING AND PRINTING PROCESS | MONOCHROMIC | ERROR | SUCCESS | 1 | ¥5 |
| WIRELESS TAG WRITING AND PRINTING PROCESS | MONOCHROMIC | ERROR | FAILURE | 0 | ¥0 |

IMAGE FORMING APPARATUS AND SERVER

CROSS-REFERENCE TO RELATED APPLICATION

This application is based upon and claims the benefit of priority from Japanese Patent Application No. 2023-102871, filed Jun. 22, 2023, the entire contents of which are incorporated herein by reference.

FIELD

Embodiments described herein relate generally to an image forming apparatus and a server for management of image forming apparatus.

BACKGROUND

Related art discloses a technique for setting print data and wireless chip data for an image forming apparatus that writes a classification related to the print data to a wireless chip of a sheet to be printed according to the print data.

BRIEF DESCRIPTION OF THE DRAWINGS

FIG. 12 is a table illustrating charges for certain processes.

FIG. 13 is a table illustrating charges for certain processes on a page basis.

DETAILED DESCRIPTION

Figure 1:
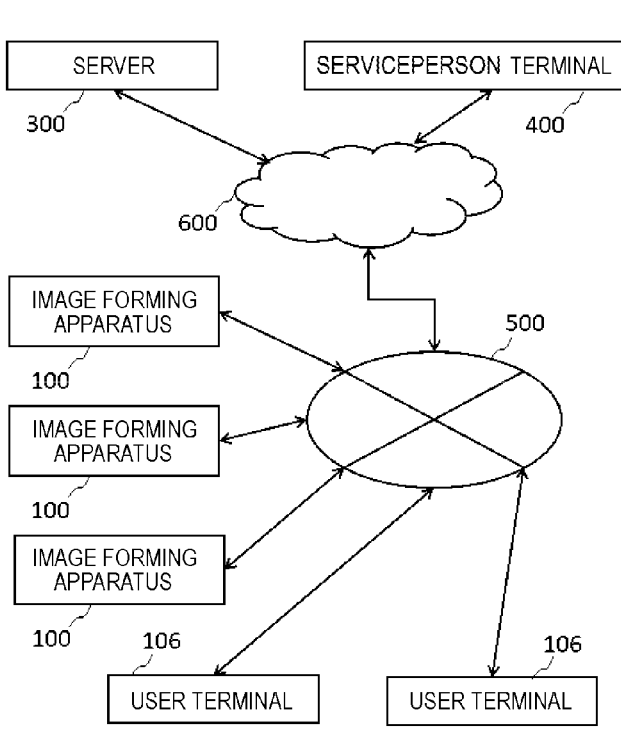
FIG. 1 depicts a printing system according to an embodiment.

An exemplary embodiment provides technological solution to existing problems in the related art related to the charging of a customer for a process including a writing of wireless chip data even if the data writing fails.

In general, according to one embodiment, an image forming apparatus includes a tag communication unit configured to communicate with wireless tags, an image forming unit configured to form image on media carrying wireless tags, and a processor. The processor is configured to permit the image forming unit to form an image on a medium when the tag communication unit successfully writes data to a wireless tag carried by the medium, and indicate the image formed on the medium by the image forming unit is a use charge target after the image forming unit is permitted to form the image on the medium.

Hereinafter, a printing system and an image forming apparatus according to certain example embodiments will be described with reference to the drawings. In the drawings, dimensions, relative scales, and the like of depicted aspects may differ from those in actuality in some cases. In the drawings, aspects of configuration, components, or the like may be omitted in some cases for the sake of illustrative convenience. In the drawings and description, the same reference symbols are used to denote substantially similar elements, components, or aspects.

FIG. 1 is a diagram illustrating a configuration of a printing system or multifunctional peripheral device system. The depicted printing system includes a plurality of image forming apparatuses 100, a plurality of user terminals 106, a server 300, and a serviceperson terminal 400. Each image forming apparatus 100 is located in a workplace (e.g., an office) or the like, and can be communicably connected to the user terminals 106 located in the same workplace, for example, via an intra-network 500 such as a local area network (LAN). This connection may be a wired connection or a wireless connection. The intra-network 500 is connected to a wide area network 600 such as the Internet. The server 300 and the serviceperson terminal 400 are connected to the wide area network 600. Accordingly, the image forming apparatuses 100 can be communicably connected to the server 300 via the intra-network 500 and the wide area network 600.

Each user terminal 106 is an information processing apparatus such as a personal computer (PC), a smartphone, a tablet terminal, or a digital camera that can request an image forming apparatus 100 to perform printing. In some examples, a user terminal 106 may be communicably connected to the image forming apparatus 100 via the wide area network 600 and then the intra-network 500. That is, the user terminal 106 may be located at a position other than the workplace where the image forming apparatus 100 is located. In some examples, a user terminal 106 may be connected directly, that is, connected locally, to the image forming apparatus 100 without being involved with the wide area network 600 and the intra-network 500. This local connection may be a wired connection or a wireless connection directly to the image forming apparatus 100.

The server 300 can be a computer administrated (controlled) directly by a management company to which maintenance checkups for the image forming apparatuses 100 have been subcontracted or a computer operated by an outsourced service providing company. The server 300 may be implemented as a single computer apparatus or may be implemented as a so-called cloud server implemented by a group of computer apparatuses each playing a divided role such as a load balancer, a storage server, an application server, and the like. The server 300 acquires data indicating an operation situation (operating state) of each image forming apparatus 100 periodically or as necessary, and also acquires notification data such as alerts transmitted from the image forming apparatuses 100. Based on the acquired data, the server 300 determines whether it is necessary to inspect or repair each image forming apparatus 100. When there is the image forming apparatus 100 which requires the inspection or repair, the server 300 can direct a serviceperson to inspect or repair the image forming apparatus 100 by transmitting information for identifying the image forming apparatus 100 to the serviceperson terminal 400.

The serviceperson terminal 400 is an information processing apparatus such as a smartphone or a tablet terminal carried by the serviceperson of the image forming apparatus 100. In FIG. 1, one serviceperson terminal 400 is illustrated, but the printing system can include a plurality of serviceperson terminals 400. In this case, the server 300 can assign an appropriate serviceperson to the image forming apparatus 100 that requires inspection or repair based on information such as serviceperson availability or positional information for each serviceperson using a position detection function of the serviceperson terminal 400 or the like.

Figure 2:
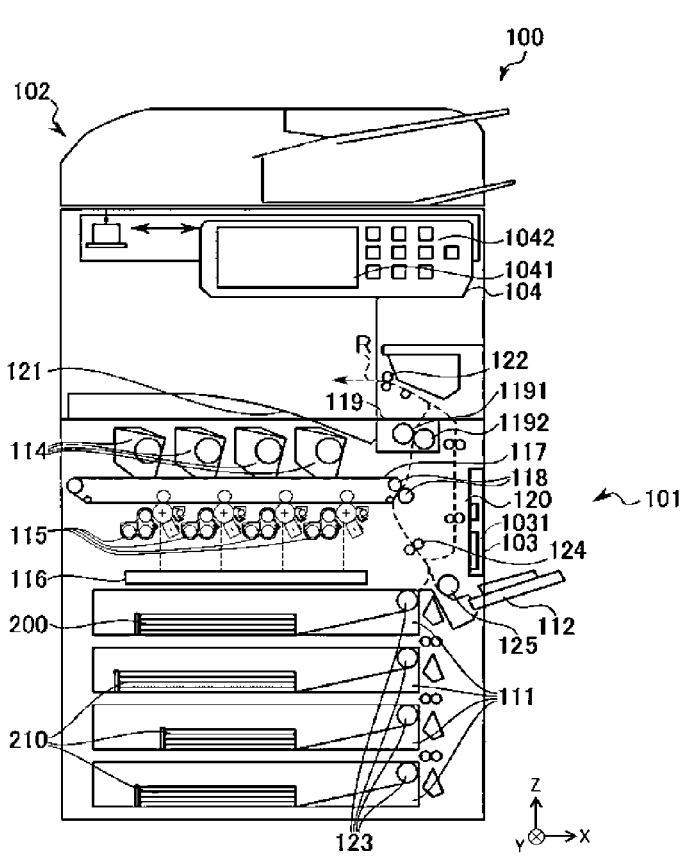
FIG. 2 depicts an image forming apparatus.

FIG. 2 is a diagram illustrating a representational configuration of an image forming apparatus 100. In the drawing, the X direction is a left-right direction, the +X direction is a rightward direction, and the −X direction is a leftward direction. The Y direction is a front-back direction, with the +Y side of the image forming apparatus 100 being the back side, and the −Y side being the front side. The Z direction is the up-down direction, the +Z side of the image forming apparatus 100 is the upper side, and the −Z side is the lower side.

The image forming apparatus 100 is, for example, a multifunction peripheral (MFP), a copy machine (copier), a printer, a facsimile machine, or the like. In the present example, the image forming apparatus 100 is assumed to be an MFP. The image forming apparatus 100 has, for example, a printing function, a scanning function, a copying function, a data writing function, a facsimile function, and the like.

The printing function is a function of forming an image on a print medium using a recording material such as toner or ink. In this context, text or the like is a type of image. The image forming apparatus 100 illustrated in FIG. 2 uses toner. Here, the print medium is, for example, a sheet of paper for printing. There may be different types of paper for printing, such as a tag-carrying medium 200 (see FIG. 3) and a medium 210 with no tag.

The scanning function is a function of reading an image from a document or the like. The copying function is a function of printing the image read from the document on a print medium using the printing function.

In this context, the data writing function is a function of writing data to a wireless tag 202 attached to the tag carrying medium 200. In the present example, when data fails to be written to the wireless tag 202 (a tag writing attempt fails), the image forming apparatus 100 does not attempt to print the requested image on the medium 200 for which data writing fails so that it can be understood that the tag data writing attempt failed. That is, the printing attempt is voided unless the tag data writing is successful. In this context, "printing attempt is voided" or "void printing" means that the image that was to be formed if tag writing was successful is not formed on the print medium. For void printing, the print medium (sheet) may be left blank or an image (a voiding image) different from the intended image to be formed if tag writing was successful may be formed on the print medium. A voiding image may be a symbol such as an x mark and/or text stating that tag writing failed.

The image forming apparatus 100 in FIG. 2 includes a printer 101, a scanner 102, a reader and writer 103 (tag reader/writer or tag communication unit), and an operational panel 104.

The printer 101 forms (prints) an image on a print medium. The printer 101 includes a sheet feed tray 111, a manual feed tray 112, a sheet feed roller 123, a toner cartridge 114, an image forming unit 115, an optical scanning device 116, a transfer belt 117, secondary transfer rollers 118, a fixing unit 119, a double-sided unit 120, a sheet discharge tray 121, and a sheet discharge roller 122. The printer 101 is an example of a printing unit that forms an image on the tag carrying medium 200.

The sheet feed tray 111 accommodates a print medium used for printing. The image forming apparatus 100 can include one sheet feed tray 111 or a plurality of the sheet feed trays 111. At least one sheet feed tray 111 accommodates the tag carrying medium 200. Other sheet feed trays 111 can accommodate the media 210 with no tags. The sheet feed roller 123 is rotated by a motor to move the print medium from the sheet feed tray 111.

Figure 3:
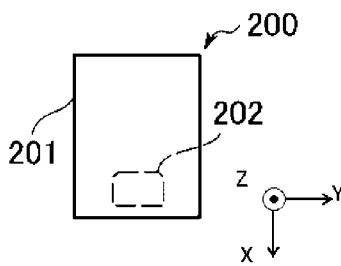
FIG. 3 depicts a tag carrying medium.

FIG. 3 is a diagram illustrating an example of a tag carrying medium 200. The tag carrying medium 200 is a print medium (e.g., a sheet of paper) to which a wireless tag 202 is attached. The tag carrying medium 200 includes a sheet portion 201 and the wireless tag 202. The sheet portion 201 is, for example, a paper in which the wireless tag 202 is embedded. In this example, the wireless tag 202 is at a position closer to one side (edge) of the sheet portion 201 than another side (edge) on the opposite side. In FIG. 3, the tag carrying medium 200 includes the wireless tag 202 at a position closer to a lower end side on the +X side of the sheet portion 201 and away from an upper end side on the −X side of the sheet portion 201. The sheet feed tray 111 accommodates the tag carrying medium 200 so that the tag carrying medium 200 is carried out from the +X side (edge) first and followed in turn by the −X side (edge) by the sheet feed roller 123.

The wireless tag 202 communicates with the reader and writer 103. Accordingly, data can be written in the wireless tag 202. The wireless tag 202 is, for example, a radio frequency (RF) tag using a radio frequency identifier (RFID) protocol or the like. The wireless tag 202 is typically a passive type of tag that operates using received radio waves as a power source.

The medium 210 is a print medium to which a wireless tag is not attached. The medium 210 is, for example, standard printing paper or the like.

The manual feed tray 112 illustrated in FIG. 2 is a tray used to manually feed a print medium. A manual feed tray roller 125 is rotated by a motor to carry the print medium from the manual feed tray 112.

The toner cartridge 114 stores a recording material such as toner to be supplied to the image forming unit 115. The image forming apparatus 100 may include one toner cartridge 114 or a plurality of the toner cartridges 114. The image forming apparatus 100 includes, in this example, four toner cartridges 114. These four toner cartridges 114 store toner colors of cyan, magenta, yellow, and black (CMYK), respectively. The colors stored in the toner cartridges 114 are not limited to the CMYK colors and other colors may be used instead or in addition. A toner cartridge 114 may store a specialized recording material. For example, a toner cartridge 114 may store a decolorable recording material which decolors (becomes visually imperceptible) at some temperature higher than a predetermined decoloring temperature.

The image forming apparatus 100 may include one image forming unit 115 or a plurality of the image forming units 115. In the present example, the image forming apparatus 100 includes four image forming units 115. The four image forming units 115 form images with the recording materials corresponding to the colors of CMYK, respectively.

Each image forming unit 115 includes a photosensitive drum and a developing unit. The developing unit develops an electrostatic latent image on the photosensitive drum using the recording material supplied from the toner cartridge 114. Accordingly, a toner image is formed on the photosensitive drum. The image formed on the photosensitive drum comes into contact with the transfer belt 117 to be transferred (primarily transferred) onto the transfer belt 117.

Figure 4:
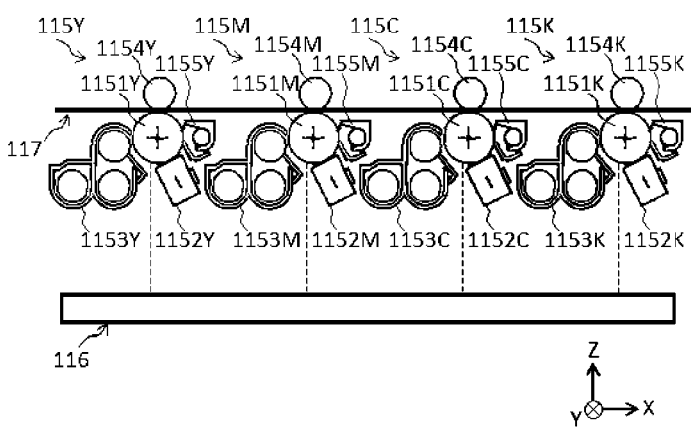
FIG. 4 depicts an image forming unit of an image forming apparatus.

FIG. 4 is an enlarged diagram illustrating the image forming units 115 of the image forming apparatus 100. Each image forming unit 115 (115Y, 115M, 115C, and 115K) includes a photosensitive drum 1151 (1151Y, 1151M, 1151C, and 1151K), a charging unit 1152 (1152Y, 1152M, 1152C, and 1152K), a developing unit 1153 (1153Y, 1153M, 1153C, and 1153K), a transfer roller 1154 (1154Y, 1154M, 1154C, and 1154K), and a cleaner 1155 (1155Y, 1155M, 1155C, and 1155K).

The photosensitive drum 1151 is an image carrier on which an electrostatic latent image is formed. The charging unit 1152 charges a surface of the photosensitive drum 1151 which is rotating with a predetermined potential. The charging unit 1152 has a grid for adjusting a charging output for the photosensitive drum 1151. The developing unit 1153 develops the electrostatic latent image formed on the photosensitive drum 1151 with the toner. The transfer roller 1154 transfers a toner image developed on the photosensitive drum 1151 onto the transfer belt 27. The cleaner 1155 cleans the surface of the photosensitive drum 1151 after the transferring.

When the printing is to form a color image, the transfer roller 1154Y gets closer to the photosensitive drum 1151Y and sandwiches the transfer belt 117, as the photosensitive drum 1151Y and the transfer belt 117 rotate. Likewise, the transfer roller 1154M gets closer to the photosensitive drum 1151M and sandwiches the transfer belt 117, as the photosensitive drum 1151M and the transfer belt 117 rotate, the transfer roller 1154C gets closer to the photosensitive drum 1151C and sandwiches the transfer belt 117, as the photosensitive drum 1151C and the transfer belt 117 rotate, and the transfer roller 1154K gets closer to the photosensitive drum 1151K and sandwiches the transfer belt 117, as the photosensitive drum 1151K and the transfer belt 117 rotate.

When printing is to form a monochromic image, the transfer roller 1154Y is located at a position away from the transfer belt 117, and thus the transfer roller 1154Y and the photosensitive drum 1151Y are not rotated. Likewise, the transfer roller 1154M is located at a position away from the transfer belt 117, and thus the transfer roller 1154M and the photosensitive drum 1151M are not rotated, and the transfer roller 1154C is located at a position away from the transfer belt 117, and thus the transfer roller 1154C and the photosensitive drum 1151C are not rotated. On the other hand, the transfer roller 1154K gets close to the transfer belt 117, and thus the transfer roller 1154K and the photosensitive drum 1151K are rotated.

In each image forming unit 115 (115Y, 115M, 115C, and 115K), the developing unit 1153 develops the electrostatic latent image formed on the photosensitive drum 1151. Each developing unit 1153 includes a developer container that includes a developing roller. The developer container contains toner for the respective color. The toner is charged by being stirred with carriers in the developer container. A developing bias is applied to the developing roller. The developing roller supplies the toner to the electrostatic latent image on the photosensitive drum 1151. The electrostatic latent image on the photosensitive drum 1151 is developed as a toner image with the supplied toner.

The optical scanning device 116 may be a laser scanning unit (LSU) or the like. The optical scanning device 116 forms an electrostatic latent image on the surface of the photosensitive drum 1151 of each image forming unit 115 by controlling a laser beam emitted to the photosensitive drum 1151 of each image forming unit 115 (115Y, 115M, 115C, and 115K) in accordance with image data or an image forming permission signal input from a processor 151 to the printer 101. The optical scanning device 116 may include a polygon mirror and a motor for rotating the polygon mirror. When printing is prepared to form an image, the optical scanning device 116 stabilizes the motor at a predetermined rotation speed.

The transfer belt 117 is, for example, an endless belt (a loop) and can be rotated by one or more rollers. When the transfer belt 117 is rotated, an image (toner image) transferred from each image forming unit 115 is conveyed to a position of the secondary transfer rollers 118.

A registration roller 124 illustrated in FIG. 2 temporarily stops the print medium carried out from the sheet feed tray 111 or from the manual feed tray 112 and resumes the conveyance of the print medium so that an image transferred onto the transfer belt 117 and then to the print medium will have an appropriate positional relation.

The secondary transfer rollers 118 includes two rollers facing each other. The secondary transfer rollers 118 transfers (secondarily transfers) the image formed on the transfer belt 117 onto the print medium passing between the secondary transfer rollers 118.

The fixing unit 119 heats and presses the print medium. Accordingly, the image transferred onto the print medium is fixed. The fixing unit 119 includes a heating unit 1191 and a pressurization roller 1192 facing each other. The heating unit 1191 is, for example, a roller including a heating source. The heating source is, for example, a resistive heater. The heated roller heats the print medium. Alternatively, the heating unit 1191 may include a film-shaped endless belt suspended by a plurality of rollers. The pressurization roller 1192 presses against the print medium passing between the pressurization roller 1192 and the heating unit 1191. When printing is performed, the fixing unit 119 raises a temperature of the heating unit 1191 to a print ready temperature while rotating the pressurization roller 1192.

The double-sided unit 120 makes it possible to print on a back surface of the print medium after printing on the front surface. For example, the double-sided unit 120 reverses the print medium front to back using a switch back or the like using rollers. In this context, the front surface of the print medium is the surface on which an image is formed without being reversed by the double-sided unit 120. The back surface of the print medium is the surface on which an image is formed after the print medium is reversed by the double-sided unit 120. The double-sided unit 120 is an example of a reversing unit that reverses the front surface and the back surface of the tag carrying medium 200.

The sheet discharge tray 121 is a platform on to which the print medium is discharged to the outside of the casing after the printing. The print medium is discharged so that the front surface is directed downward when the print medium is discharged to the sheet discharge tray 121 without first being reversed by the double-sided unit 120. The image forming apparatus 100 discharges the print media with the front surfaces directed downward, so that the order of the discharged print media is in a page order when the print media are printed in a print job with an ascending order from a smaller page number to a larger page number.

Figure 5:
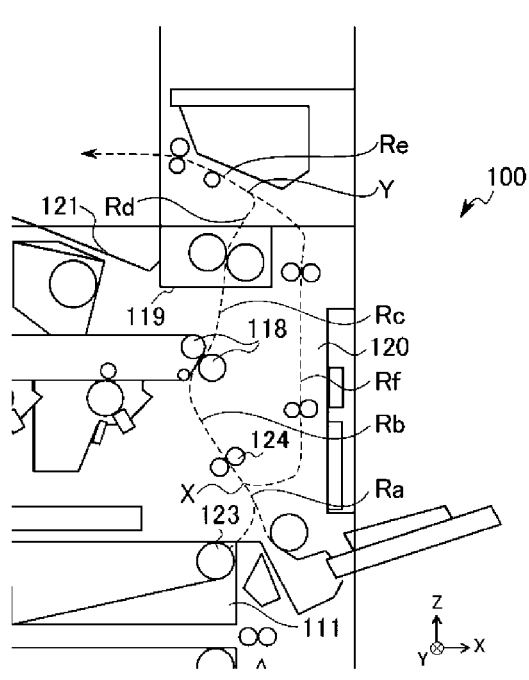
FIG. 5 depicts a conveyance route in an image forming apparatus.

FIG. 5 is an enlarged diagram illustrating a conveyance route in the image forming apparatus 100. The print medium passes along a route R by functions of the sheet feed roller 123 and the double-sided unit 120. The route R includes routes Ra to Rf (route portions). The route Ra is from the sheet feed tray 111 to the registration roller 124. The print medium passing through the double-sided unit 120 meets the route Ra at a point X on the route Ra. The route Rb is from the registration roller 124 to the secondary transfer roller 118. The route Rc is from the secondary transfer roller 118 to the fixing unit 119. The route Rd is from the fixing unit 119 to a point Y that is an entrance of the double-sided unit 120. The route Re is from point Y to the sheet discharge tray 121. The route Rf passes through the inside of the double-sided unit 120 from the point Y to the point X.

When a print medium is discharged without being reversed by the double-sided unit 120, the image forming apparatus 100 conveys the print medium from the sheet feed tray 111 to the route Ra, past the point X and the registration roller 124 to the route Rb, past the secondary transfer roller 118 to the route Rc, past the fixing unit 119 to the route Rd, past the point Y to the route Re, and then to the sheet discharge tray 121. When the print medium is reversed by the double-sided unit 120, the image forming apparatus 100 conveys the print medium from the sheet feed tray 111 to the route Ra, past the point X and the registration roller 124 to the route Rb, past the secondary transfer roller 118 to the route Rc, past the fixing unit 119 to the route Rd to the point Y, and then to the route Re. Thereafter, the image forming apparatus 100 conveys the print medium back along the route Re past the point Y to the route Rf back to the point X and then the registration roller 124, to the route Rb by switching back the print medium by the functioning of the double-sided unit 120. Further, the image forming apparatus 100 conveys the print medium from the registration roller 124 to the route Rb past the secondary transfer roller 118 to the route Rc, past the fixing unit 119 to the route Rd and the point Y to the route Re. The image forming apparatus 100 then discharges the print medium to the sheet discharge tray 121 or do another switch back.

The scanner 102 in FIG. 2 reads an image from a document. The scanner 102 is, for example, an optical reduction type of scanner that includes an image sensor element such as a charge-coupled device (CCD) image sensor. Alternatively, the scanner 102 is a contact image sensor (CIS) type of scanner that includes an image sensor element such as a complementary metal-oxide-semiconductor (CMOS) image sensor. Alternatively, the scanner 102 may be any other type of scanner.

The reader and writer 103 serves as a communication unit that can communicate with the wireless tag 202. The reader and writer 103 includes an antenna 1031. The reader and writer 103 communicates with the wireless tag 202 using the antenna 1031. The antenna 1031 transmits radio waves to the wireless tag 202. In addition, the antenna 1031 receives radio waves transmitted from the wireless tag 202. The reader and writer 103 is provided at a position at which communication with the wireless tag 202 on a tag carrying medium 200 temporarily stopped at the registration roller 124 is possible. Alternatively, the reader and writer 103 may be provided at another position. For example, the reader and writer 103 may be provided at a position at which communication with the wireless tag 202 of a tag carrying medium 200 being reversed by the double-sided unit 120 is possible.

The reader and writer 103 demodulates the radio waves transmitted from a wireless tag 202 and as received by the antenna 1031. Accordingly, the reader and writer 103 reads information recorded in the wireless tag 202. The reader and writer 103 also transmits information to the wireless tag 202 by modulating the radio waves transmitted from the antenna 1031 to the wireless tag 202. Accordingly, the reader and writer 103 can write information in the wireless tag 202. the reader and writer 103 has a function of a reader that reads information recorded in the wireless tag 202 and a function of a writer that writes information in the wireless tag 202. The reader and writer 103 is an example of a writing unit that writes data to the wireless tag 202.

The operational panel 104 includes a man-machine interface (user interface) or the like that permits input and output of information between the image forming apparatus 100 and an operator of the image forming apparatus 100. The operational panel 104 includes, for example, a touch panel 1041 and an input device 1042. The touch panel 1041 is, for example, a panel in which a display such as a liquid crystal display or an organic electro-luminescence (EL) display and a pointing device by a touch input panel are stacked. The display included in the touch panel 1041 functions as a display device that displays a screen for notifying the operator of various types of information. The touch panel 1041 functions as an input device that receives a touch operation performed by the operator. The input device 1042 receives an operation performed by the operator. The input device 1042 is, for example, a button, a keyboard, a keypad, a touch pad, or the like.

Figures 6, 7:
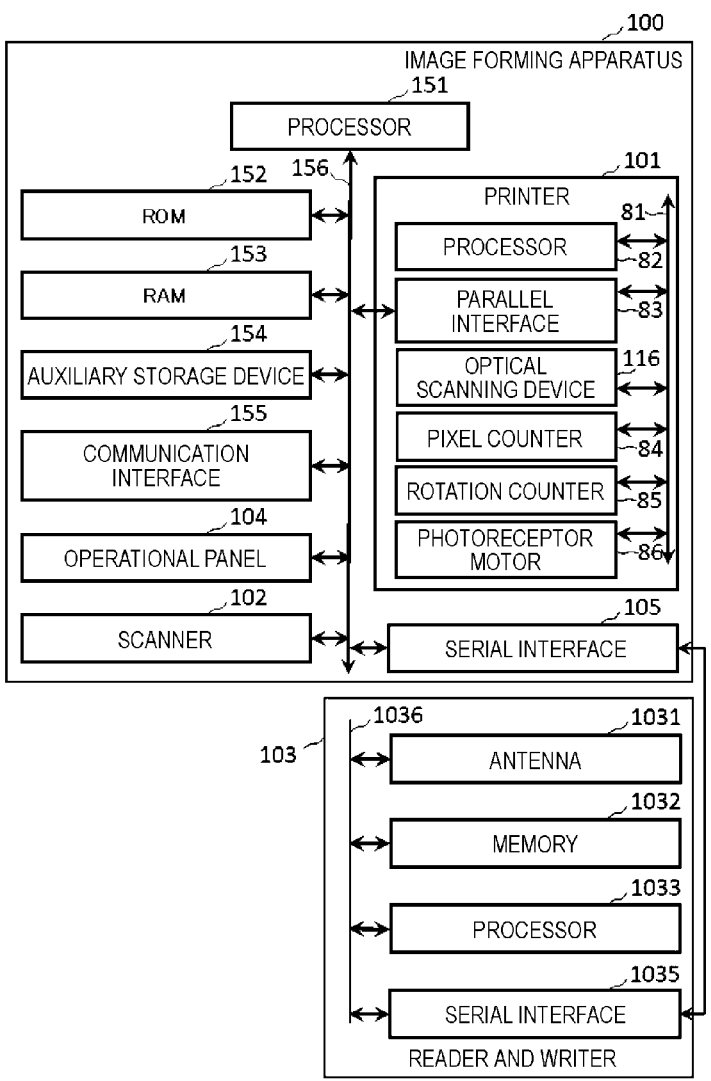
FIG. 6 is a block diagram of a reader/writer device ("reader and writer") and an image forming apparatus.
FIG. 7 depicts a configuration example of data stored by a wireless tag.

FIG. 6 is a block diagram illustrating the reader and writer 103 and the image forming apparatus 100. The image forming apparatus 100 includes a processor 151, a read-only memory (ROM) 152, a random access memory (RAM) 153, an auxiliary storage device 154, a communication interface 155, the printer 101, the scanner 102, a serial interface 105, and the operational panel 104. These units are connected to each other via a bus 156 or the like.

The processor 151 corresponds to a central part of a computer that performs a process such as calculation and control necessary for an operation of the image forming apparatus 100. The processor 151 controls each sub-unit such that various functions of the image forming apparatus 100 are implemented based on programs such as firmware, system software, and application software stored in the ROM 152, the auxiliary storage device 154, or the like. The processor 151 performs processes based on the programs. All or some of the programs may be embedded as circuitry of the processor 151. The processor 151 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), or the like. Alternatively, the processor 151 is a combination of several of these.

The processor 151 counts the number of pages with color images input to the printer 101 as the number of color input pages. The processor 151 counts the number of pages with only monochromic images input to the printer 101 as the number of monochromic input pages. The processor 151 also counts the number of sheets fed to the printer 101.

The processor 151 counts the number of pages on which the printer 101 successfully prints requested color images as the number of color success pages. The processor 151 counts the number of pages on which the printer 101 successfully prints requested monochromic images as the number of monochromic success pages. The number of pages on which the printer 101 successfully prints is the number of fed pages less the number of jam or error pages caused due to a mechanical error related to a fed sheet or for which otherwise successful image forming does not occur.

The processor 151 counts the number of pages on which the printer 101 cannot successfully form color images as the number of color failure pages. The processor 151 counts the number of pages on which the printer 101 cannot successfully form monochromic images as the number of monochromic failure pages. When the image data input to the printer 101 is for a blank (no image) page, the processor 151 may be configured not to count this type of page (blank page) in the number of color input pages or the number of monochromic input pages.

The processor 151 updates a charging count (basis for charging an operator for use of the image forming apparatus 100 or the like) when the printer 101 notifies a count-up event.

The processor 151 may be configured to update the charging count when the printer 101 notifies a number of pixels counted by a pixel counter 84.

The processor 151 may be configured to update the charging count when a response indicating that a tag writing by the reader and writer 103 was successful. A tag writing charge (count-up) event may occur whether or not a sheet with the successfully written tag was printed or not.

The change in the charging count may differ depending on, for example, a type of job. For example, the processor 151 increases the charging count by 1 for a wireless tag writing job, 2 for a monochromic printing job, 4 for a color printing job, and 5 for a combined wireless tag writing and printing job.

The change in charging count may be set to 0 for a voiding print notice.

The change in charging count may be set to 0 if the number of pixels counted by the pixel counter 84 as notified by the printer 101 is less than some predetermined threshold number. For example, the pixel threshold number may be 0 or any natural number corresponding to the number of pixels that may be considered so small that the resulting page may be considered still to be substantially white (unused) paper.

The change in the charging count may differ depending on, for example, a size of a print medium. For example, the processor 151 may be configured to double the charging count when the size of the print medium is A3 size or any size larger than A4 size (e.g., a standard sheet size).

In an example, the charging count increase is set to 5 for the case of a wireless tag writing and printing job. When a response indicating that the writing for a data writing command in the wireless tag writing and printing job is successful is not received from the reader and writer 103, the processor 151 may be configured so that the increase is set to 4 (obtained by subtracting 1, corresponding to the charge amount for a wireless tag writing job, from the initial value 5).

The processor 151 may be configured such that change is set to 0 when a response indicating that the tag writing was successful cannot be received from the reader and writer 103.

In general, the processor 151 counts the number of times the data writing command is transmitted to the reader and writer 103 as the number of times the data writing command is transmitted. The processor 151 counts the number of times a response indicating that the writing for the data writing command is successful is received from the reader and writer 103 as the number of data writing successes. The processor 151 counts the number of times a response indicating that the writing for the data writing command fails is received from the reader and writer 103 as the number of data writing failures.

Each of these counted values is stored in the RAM 153 or the auxiliary storage device 154. Each of the counted values is stored in association with a user of the image forming apparatus 100. Each of the counted values may also be stored as a total number (cumulative apparatus value) not associated with any particular user of the image forming apparatus 100.

The processor 151 transmits each count value stored in the RAM 153 or the auxiliary storage device 154 to the server 300 via the communication interface 155. The server 300 stores each transmitted count value as part of data indicating an operation situation (status) of the image forming apparatus 100.

The processor 151 calculates a charging amount (charge amount) by multiplying the stored charging count by a unit price. As described, the change in the charging count may differ depending on a type of job even if the unit price may be the same irrespective of the type of job.

In some instances, the unit price may differ depending on the type of job such as data writing, color printing, or monochromic printing.

The processor 151 may calculate a charging amount by multiplying the stored charging count by a standard printing unit price.

The processor 151 may calculate a charging amount by multiplying the stored number of data writing successes by a data writing unit price.

The processor 151 may calculate a charging amount by multiplying the stored number of color success pages by a color printing unit price.

The processor 151 may calculate a charging amount by multiplying the stored number of monochromic success pages by a monochromic printing unit price.

The processor 151 may calculate a charging amount by multiplying the stored number of color input pages, the number of monochromic input pages, the number of fed sheets, the number of times the data writing command is transmitted, or the number of data writing failures by respectively corresponding unit prices.

The ROM 152 is a nonvolatile memory. The ROM 152 stores, for example, firmware or the like among the above-described programs. The ROM 152 stores data or the like used for the processor 151 to perform various processes.

The RAM 153 is a memory used for reading and writing data. The RAM 153 is used as a work area where data temporarily used for the processor 151 to perform various processes is stored. The RAM 153 is typically a volatile memory.

The auxiliary storage device 154 is, for example, an electric erasable programmable read-only memory (EEPROM), a hard disk drive (HDD), a flash memory, or the like. The auxiliary storage device 154 stores, for example, system software, application software, or the like. The auxiliary storage device 154 stores data used for the processor 151 to perform various processes, data generated by the processes performed by the processor 151, various set values, and the like. The image forming apparatus 100 may include an interface into which a storage medium such as a memory card or a universal serial bus (USB) memory can be inserted as the auxiliary storage device 154. The interface reads and writes information from and to the storage medium.

The printer 101 forms an image in accordance with image data or an image forming permission signal from the processor 151.

The printer 101 includes a processor 82, a parallel interface 83, a pixel counter 84, a rotation counter 85, a photoreceptor motor 86, and an optical scanning device 116. These units are connected to each other via a bus 81 or the like.

The processor 82 receives image data from the processor 151 of the image forming apparatus 100 via the parallel interface 83.

The optical scanning device 116 forms an electrostatic latent image on the surface of the photosensitive drum 1151 of each image forming unit 115 by controlling a laser beam for each image forming unit 115 (115Y, 115M, 115C, and 115K) in accordance with image data from the processor 82.

The optical scanning device 116 forms an electrostatic latent image in accordance with the image data when an image is permitted to be formed by the image forming permission signal.

The optical scanning device 116 does not form an electrostatic latent image even when the image data has been input if an image is prohibited from being formed according to the image forming permission signal.

The photoreceptor motor 86 rotates the photosensitive drum 1151 of each image forming unit 115 (115Y, 115M, 115C, and 115K) under the control of the processor 82.

The pixel counter 84 counts pixels that are image portion points at which the optical scanning device 116 can irradiate the photosensitive drum 1151 of each image forming unit 115 (115Y, 115M, 115C, and 115K) with the laser beam. The pixel counter 84 counts the number of pixels, for example, for each color and each printed page, and acquires these counted number of pixels. The pixel counter 84 counts the number of light emitting pixels of laser for each color of image forming and each page. The pixel counter 84 counts the number of light emitting pixels for each color of image forming. The pixel counter 84 counts the number of pixels when the image is permitted to be formed by the image forming permission signal. When the image is not permitted to be formed by the image forming permission signal, the pixel counter 84 notifies the processor 82 of the number of pixels counted after the image is permitted to be formed by the image forming permission signal. The processor 82 notifies the processor 151 of the image forming apparatus 100 of the number of pixels counted by the pixel counter 84.

The rotation counter 85 counts the number of times each photosensitive drum 1151 (1151Y, 1151M, 1151C, and 1151K) is rotated on a per drum basis.

The processor 82 transmits each of the counted values to the processor 151 via the parallel interface 83. The processor 151 stores each of the counted values received from the processor 82 in the RAM 153 or the auxiliary storage device 154. The number of light emitting pixels for each color of image forming is stored as a total number in the auxiliary storage device 154. The total number of light emitting pixels for each color forming may be reset when the photosensitive drum 1151 for the corresponding color is replaced. Likewise, the number of times each photosensitive drum 1151 (1151Y, 1151M, 1151C, and 1151K) is rotated may be reset when the corresponding photosensitive drum 1151 is replaced.

After the pixel counter 84 notifies of the number of pixels while the registration roller 124 temporarily stops the print medium, the processor 82 notifies the processor 151 of occurrence of a count-up event.

When the number of pixels is less than some predetermined threshold number, the processor 82 may be configured not to notify of an occurrence of a count-up event.

The scanner 102 reads an image from a document and outputs read image data. The output image data is stored in the RAM 153 or the auxiliary storage device 154.

The operational panel 104 displays a visual image based on display data output from the processor 151. The operational panel 104 receives an execution operation from a user and sends the execution operation instruction to the processor 151.

The processor 151 displays the charging count, the unit price, and the calculated charging amount on the operational panel 104.

The processor 151 may display the number of data writing successes, the data writing unit price, and the calculated charging amount on the operational panel 104.

The processor 151 may display the number of color success pages, the color printing unit price, and the calculated charging amount on the operational panel 104.

The processor display 151 may the number of monochromic success pages, the monochromic printing unit price, and the calculated charging amount on the operational panel 104.

The processor 151 may display the number of color input pages, the number of monochromic input pages, the number of fed sheets, the number of times the data writing command is transmitted, the number of data writing failures, the respectively corresponding unit prices, and the calculated charging amount on the operational panel 104.

The processor 151 may cause the printer 101 to print the charging count, the unit price, and the calculated charging amount on a print medium.

The processor 151 may cause the printer 101 to print the number of data writing successes, the data writing unit price, and the calculated charging amount on the print medium.

The processor 151 may cause the printer 101 to print the number of color success pages, the color printing unit price, and the calculated charging amount on the print medium.

The processor 151 may cause the printer 101 to print the number of monochromic success pages, the monochromic printing unit price, and the calculated charging amount on the print medium.

The processor 151 may cause the printer 101 to print the number of color input pages, the number of monochromic input pages, the number of fed sheets, the number of times the data writing command is transmitted, the number of data writing failures, the respectively corresponding unit prices, and the calculated charging amount on the print medium.

The processor 151 displays a visual image for urging a maintenance checkup on the operational panel 104 when the number of sheets fed to the printer 101 exceeds a predetermined number.

In the present embodiment, since the number of sheets fed to the printer 101 can be counted and recorded irrespective of success or failure of the wireless tag writing, deterioration in the sheet feed roller 123, the transfer belt 117, the secondary transfer roller 118, the fixing unit 119, or the sheet discharge roller 122 in the conveyance route of the print medium can be appropriately predicted and a maintenance checkup can be timely requested without concern with the success or failure of the wireless tag writing operations.

When the number of times the photosensitive drum 1151Y is rotated exceeds a predetermined number of times, the processor 151 displays a visual image for urging a maintenance checkup of the photosensitive drum 1151Y or the image forming unit 115Y on the operational panel 104. When the number of times the photosensitive drum 1151M is rotated exceeds a predetermined number of times, the processor 151 displays a visual image for urging a maintenance checkup of the photosensitive drum 1151M or the image forming unit 115M on the operational panel 104. When the number of times the photosensitive drum 1151C is rotated exceeds a predetermined number of times, the processor 151 displays a visual image for urging a maintenance checkup of the photosensitive drum 1151C or the image forming unit 115C on the operational panel 104. When the number of times the photosensitive drum 1151K is predetermined number of times, the processor 151 displays a visual image for urging a maintenance checkup of the photosensitive drum 1151K or the image forming unit 115K on the operational panel 104.

In the present embodiment, since the number of times each photosensitive drum 1151 (1151Y, 1151M, 1151C, and 1151K) is rotated is counted and recorded for each photosensitive drum 1151 (1151Y, 1151M, 1151C, and 1151K) irrespective of success or failure of the wireless tag writing, deterioration in each photosensitive drum 1151 (1151Y, 1151M, 1151C, and 1151K) can be appropriately predicted and a maintenance checkup can be requested without concern with the success or failure of the wireless tag writing.

When the total number of light emitting pixels of laser emitted to the photosensitive drum 1151Y exceeds a predetermined number, the processor 151 displays a visual image for urging a maintenance checkup of the photosensitive drum 1151Y on the operational panel 104. When the total number of light emitting pixels of laser emitted to the photosensitive drum 1151M exceeds a predetermined number, the processor 151 displays a visual image urging checkup the for a maintenance of photosensitive drum 1151M on the operational panel 104. When the total number of light emitting pixels of laser emitted to the photosensitive drum 1151C exceeds a predetermined number, the processor 151 displays a visual image for urging a maintenance checkup of the photosensitive drum 1151C on the operational panel 104. When the total number of light emitting pixels of laser emitted to the photosensitive drum 1151K exceeds a predetermined number, the processor 151 displays a visual image for urging a maintenance checkup of the photosensitive drum 1151K on the operational panel 104.

In the present embodiment, since the total number of light emitting pixels of laser for each color of image forming is recorded irrespective of success or failure of the wireless tag writing, deterioration in each photosensitive drum 1151 (1151Y, 1151M, 1151C, and 1151K) can be appropriately predicted and a maintenance checkup can be requested without concern with the success or failure of the wireless tag writing.

The communication interface 155 allows the image forming apparatus 100 to perform communication via a network such as a local area network (LAN) or the Internet. The bus 156 includes a control bus, an address bus, and a data bus and transmits a signal transmitted or received in each unit of the image forming apparatus 100. The serial interface 105 communicates with a serial interface 1035 of the reader and writer 103.

The reader and writer 103 includes a processor 1033, a memory 1032, and the serial interface 1035. These units are connected to each other via a bus 1036 or the like.

The processor 1033 corresponds to a central part of a computer that performs a process such as calculation and control necessary for an operation of the reader and writer 103. The processor 1033 controls each sub-unit such that various functions of the reader and writer 103 are implemented based on programs such as firmware stored in the memory 1032. The processor 1033 performs a process based on the programs. All or some of the programs may be embedded as circuitry of the processor 1033. The processor 1033 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), or the like. Alternatively, the processor 1033 is a combination of several of these. The processor 1033 functions to transmit and receive radio waves to and from the wireless tag 202 using the antenna 1031.

The memory 1032 stores, for example, firmware or the like. The memory 1032 also stores data or the like used for the processor 1033 to perform various processes. The serial interface 1035 communicates with the serial interface 105 of the image forming apparatus 100.

FIG. 7 is a diagram illustrating a configuration example of data stored by the wireless tag 202.

The wireless tag 202 of this example includes four memory banks "00", "01", "02", and "03". The memory bank "00" (Reserved) stores a kill password, an access password, and the like. The memory bank "01" (EPC) stores an electrical product code (EPC) or the like. The memory bank "02" stores wireless tag identification information (TID) for identifying the wireless tag 202. In the present example, the memory bank "02" stores tag manufacturer information, model information, a serial number, and the like as the TID. For example, the memory bank "02" stores data for the wireless tag 202 as manufactured. While the memory banks "00", "01", and "02" store data used to control or communicate with the wireless tag 202, the memory bank "03" (User) stores other data (user data or payload data). The configuration of the data stored by the wireless tag 202 is not limited to this specific configuration.

Figure 8:
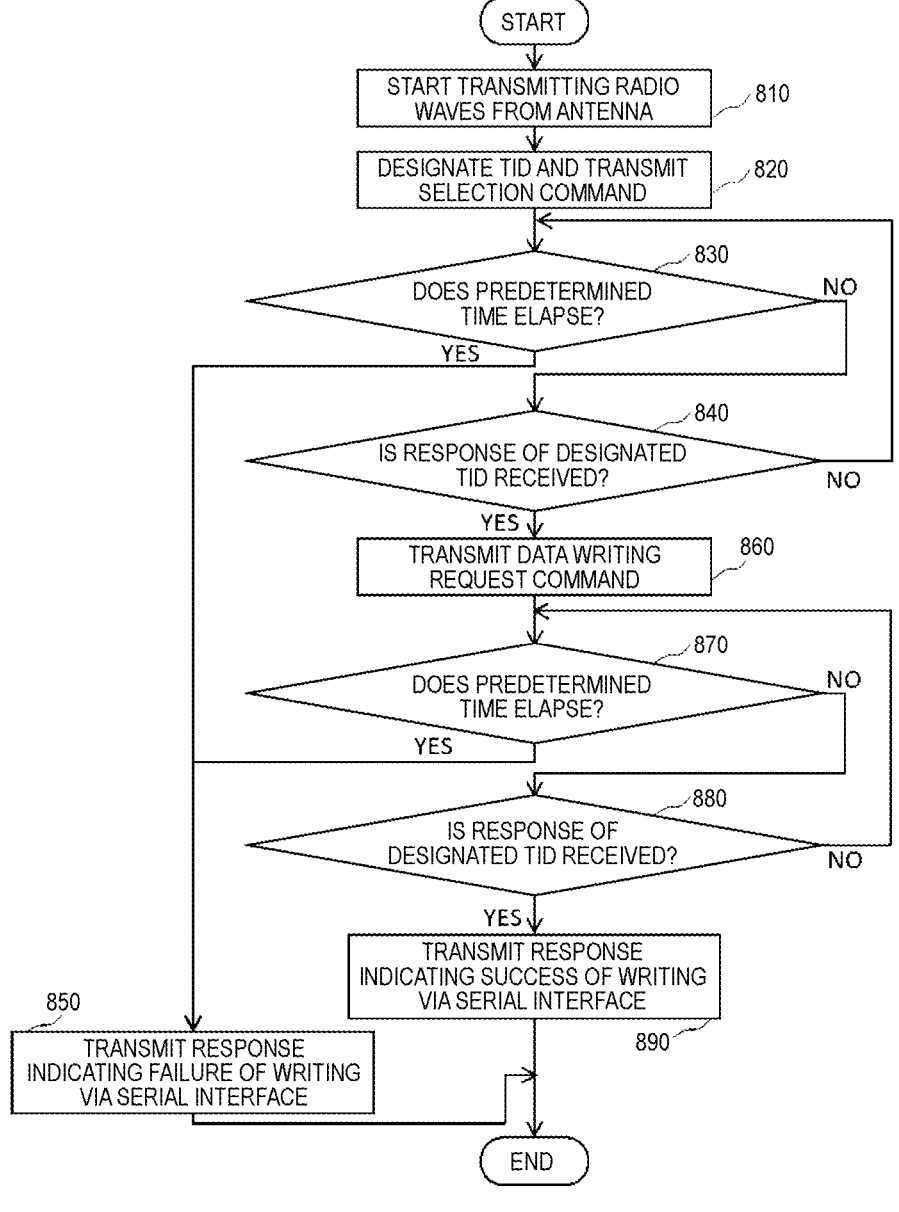
FIG. 8 is a flowchart illustrating a process of a processor of a reader/writer.

FIG. 8 is a flowchart illustrating a process of the processor 1033 of the reader and writer 103. The functions of by the reader and writer 103 are implemented by causing the processor 1033 to execute a program stored in the memory 1032 or the like.

The processor 1033 can cause writing of data (for example, an EPC in the memory bank "01" or user data in the memory bank "03") to the wireless tag 202.

The processor 1033 receives a data writing command along with writing data from the processor 151 of the image forming apparatus 100 via the serial interface 1035. The data writing command can include the data to be written (writing data) and the TID of the wireless tag 202 to which the writing command is directed.

After the data writing command is acquired (start), the processor 1033 starts transmitting from the antenna 1031 (ACT 810).

After the processor 1033 starts transmitting the radio waves, the processor 1033 transmits a selection command to select the wireless tag 202 matching the TID indicated by the data writing command (ACT 820).

After the selection command is transmitted, the processor 1033 waits until a predetermined amount of time elapses (ACT 830) or for a response to be received from the wireless tag 202 (ACT 840).

When the predetermined amount of time elapses without a response from the wireless tag 202 (YES in ACT 830), the processor 1033 transmits a response indicating that the writing fails to the processor 151 via the serial interface 1035 (ACT 850).

Typically, the wireless tag 202 receives the selection command from the antenna 1031, then makes a response when the TID included in the selection command matches its TID.

After the response is received from the wireless tag 202 via the antenna 1031 (YES in ACT 840), the processor 1033 transmits a data writing request command including writing data and the TID of the wireless tag 202 to the wireless tag 202 via the antenna 1031 (ACT 860). After the data writing request command is transmitted, the processor 1033 waits until a predetermined amount of time elapses (ACT 870) or for a response to be received from the wireless tag 202 (ACT 880).

When the predetermined time elapses without a response from the wireless tag 202 (YES in ACT 870), the processor 1033 transmits a response indicating that the writing fails to the processor 151 via the serial interface 1035 (ACT 850).

Typically, when the wireless tag 202 receives a data writing request command and the TID included in the data writing request command matches its TID, the wireless tag 202 writes the writing data in its memory. After the writing data is stored (written), the wireless tag 202 transmits a response indicating that the writing was successful.

After the response is received from the wireless tag 202 via the antenna 1031 (YES in ACT 880), the processor 1033 transmits a response indicating that the writing was successful to the processor 151 via the serial interface 1035 (ACT 890).

A modification in which the processor 1033 does not transmit a selection command and thus does not wait for a response may be adopted. That is, in some examples, ACT 820, ACT 830, and ACT 840 may be omitted.

Figure 9:
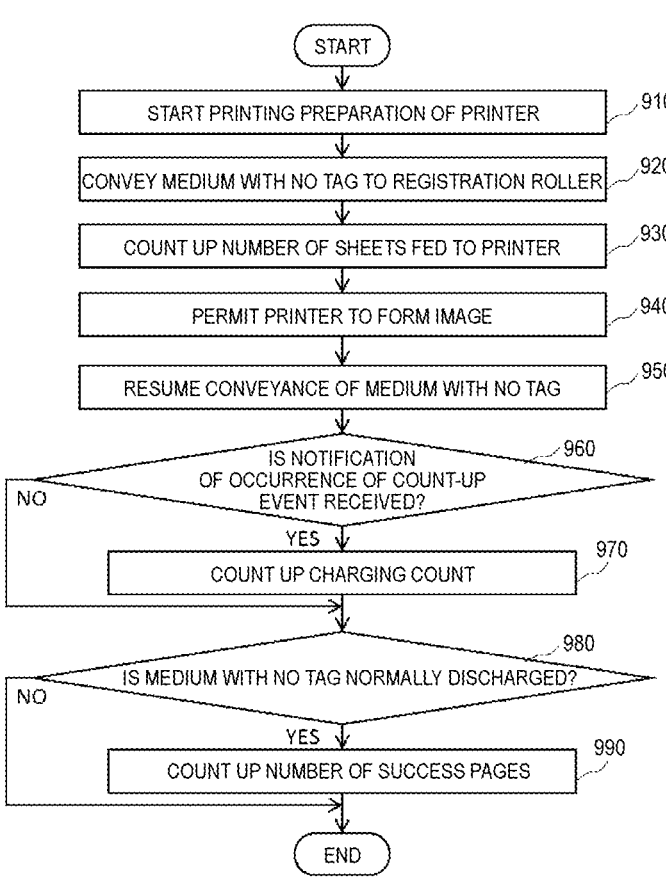
FIG. 9 is a flowchart illustrating a processing of a printing job by a processor of an image forming apparatus.

FIG. 9 is a flowchart illustrating a process of a printing job by the processor 151 of the image forming apparatus 100. Functions of the image forming apparatus 100 are implemented by causing the processor 151 to execute a program stored in the ROM 152, the auxiliary storage device 154, or the like.

For example, the processor 151 receives a printing job via the communication interface 155 and starts the process of FIG. 9. In other examples, the processor 151 receives a printing execution operation instructions via the operational panel 104 and starts the process of FIG. 9.

The processor 151 causes the printer 101 to start printing preparation (ACT 910). The start of the printing preparation is, for example, driving of the motor of the optical scanning device 116, start of rotation of the transfer belt 117 and the secondary transfer roller 118, start of rotation of the fixing unit 119, start of a warming of the fixing unit 119 to a ready temperature, or the like. When the printing job is a job for performing color printing, printing preparation is performed to form a color image. When the printing job is a job for performing monochromic printing, printing preparation is performed to form a monochromic image.

After the printing preparation, the processor 151 causes the sheet feed roller 123 to carry the medium 210 from the sheet feed tray 111 and causes the registration roller 124 to temporarily stop the medium 210 (ACT 920). The processor 151 counts up (tracks or increments) the number of sheets fed to the printer 101 (ACT 930).

After the medium 210 has been temporarily stopped by the registration roller 124, the processor 151 permits the printer 101 to form an image with the image forming permission signal and transmits the image data to the printer 101 (ACT 940).

The processor 151 resumes the conveyance of the medium 210 that was temporarily stopped by the registration roller 124 at a timing at which the print medium and the image on the transfer belt 117 will have an appropriate positional relation (ACT 950).

The image formed on the transfer belt 117 is transferred onto the medium 210 passing through the secondary transfer rollers 118. The medium 210 onto which the image is transferred passes through the fixing unit 119 and is discharged to the sheet discharge tray 121.

After a notification of a count-up event is received from the printer 101 (YES in ACT 960), the processor 151 increases (counts up) the charging count (ACT 970).

After the printer 101 normally discharges the medium 210 (YES in ACT 980), the processor 151 increases the number of success pages (ACT 990). In ACT 990, the number of color success pages is increased (counted up) when the printing job is for performing color printing. The number of monochromic success pages is increased when the printing job is for performing monochromic printing.

The processor 151 can also acquire the number of times each photosensitive drum 1151 (1151Y, 1151M, 1151C, and 1151K) was rotated from the rotation counter 85, records the number of times in the RAM 153 or the auxiliary storage device 154, and then ends the process.

Figure 10:
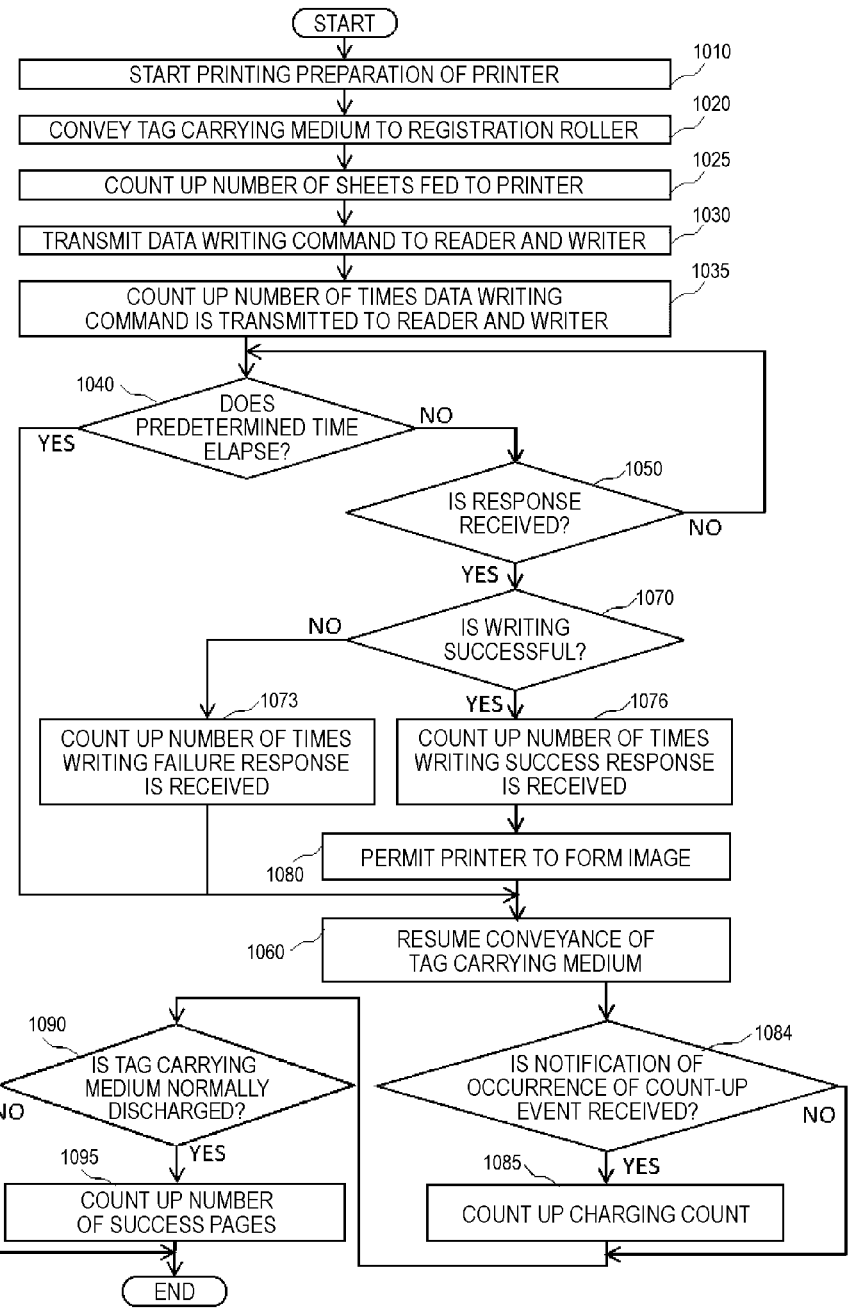
FIG. 10 is a flowchart illustrating processing of a wireless tag writing and a print job by a processor of an image forming apparatus.

FIG. 10 is a flowchart illustrating a process of the wireless tag writing and printing job by the processor 151 of the image forming apparatus 100. The functions of the image forming apparatus 100 are implemented by causing the processor 151 to execute a program stored in the ROM 152, the auxiliary storage device 154, or the like.

For example, the processor 151 receives a wireless tag writing and printing job via the communication interface 155 and starts the process of FIG. 10. In other examples, the processor 151 receives a wireless tag writing and printing execution operation instruction from the operational panel 104 and starts the process of FIG. 10.

The processor 151 first causes the printer 101 to start printing preparation (ACT 1010). The start of the printing preparation is, for example, driving of the motor of the optical scanning device 116, start of rotation of the transfer belt 117 and the secondary transfer rollers 118, start of rotation of the fixing unit 119, warming of the fixing unit 119 to a ready temperature, or the like.

After the printing preparation, the processor 151 causes the sheet feed roller 123 to carry a tag carrying medium 200 from the sheet feed tray 111 and causes the registration roller 124 to temporarily stop the tag carrying medium 200 (ACT 1020). The processor 151 counts up (tracks or increments) the number of sheets fed to the printer 101 (ACT 1025).

After the tag carrying medium 200 is temporarily stopped by the registration roller 124, the processor 151 transmits a data writing command along with data to be written to the wireless tag 202 (writing data) to the reader and writer 103 via the serial interface 105 (ACT 1030). The processor 151 increases the tracked value for the number of times the data writing command has been transmitted to the reader and writer 103 (ACT 1035). The processor 151 waits until a predetermined amount of time elapses (ACT 1040) or a response is received from the reader and writer 103 (ACT 1050).

If the predetermined amount of time elapses before a response is received (NO in ACT 1040), the processor 151 resumes the conveyance of the tag carrying medium 200 that was temporarily stopped by the registration roller 124 but does so while the printer 101 is prohibited from forming an image according to the image forming permission signal (ACT 1060).

If a response indicating that the tag writing failed is received from the reader and writer 103 (YES in ACT 1050 followed by NO in ACT 1070), the processor 151 counts up the number of times the response indicating the writing for the data writing command fails has been received (ACT 1073) and the processor 151 resumes the conveyance of the tag carrying medium 200 while the printer 101 is prohibited from forming an image (ACT 1060).

After the processor 151 resumes the conveyance of the tag carrying medium 200 in ACT 1060 1, the processor 151 does not cause a toner image to be formed on the transfer belt 117 and thus no toner image is transferred onto the tag carrying medium 200 passing through the secondary transfer rollers 118. The tag carrying medium 200 (without image) passes through the fixing unit 119 and is discharged to the sheet discharge tray 121.

In this processing, the printer 101 is prohibited from forming an image by supply or not of the image forming permission signal. Since a count-up event does not occur (NO in ACT 1084), the processor 151 does not change the charging count. Since the intended image was not formed on the tag carrying medium 200 (NO in ACT 1090), the processor 151 also does not increase the number of success pages.

When a response indicating that the tag writing was successful is received (YES in ACT 1050 followed by YES in ACT 1070), the processor 151 increases the value for the number of times the response indicating that the writing for the data writing command is successful has been received from the reader and writer 103 (ACT 1076), then permits the printer 101 to form an image by setting of the image forming permission signal, and transmits the image data to the printer 101 (ACT 1080).

The processor 151 now resumes the conveyance of the tag carrying medium 200 temporarily stopped by the registration roller 124 at a timing at which the print medium and the image transferred onto the transfer belt 117 will have an appropriate positional relation (ACT 1060). Since the processor 151 permits the printer 101 to form an image and transmits the image data to the printer 101, the toner image is formed on the transfer belt 117 and transferred onto the tag carrying medium 200 passing through the secondary transfer rollers 118. The tag carrying medium 200 (with toner image) passes through the fixing unit 119 and is discharged to the sheet discharge tray 121.

When the processor 151 receives a notification of a count-up event from the printer 101 (YES in ACT 1084), the processor 151 changes the charging count (ACT 1085).

When the printer 101 normally r discharges the tag carrying medium 200 (YES in ACT 1090), the processor 151 also increases the number of success pages (ACT 1095).

The processor 151 can also acquire the number of times each photosensitive drum 1151 (1151Y, 1151M, 1151C, and 1151K) was rotated from the rotation counter 85, records the number of times in the RAM 153 or the auxiliary storage device 154, and then ends the process.

In some examples, when the tag response cannot be received before the predetermined amount of time elapses (NO in ACT 1040) or if the received tag response indicates that the tag writing failed (YES in ACT 1050 followed by NO in ACT 1070), the processor 151 may transmit image data for a blank page to the printer 101 instead of prohibiting the printer 101 from forming an image by use of an image forming permission signal. Alternatively, the image data may simply not be transmitted to the printer 101 as a means of prohibiting the printer 101 from forming an image.

Figure 11:
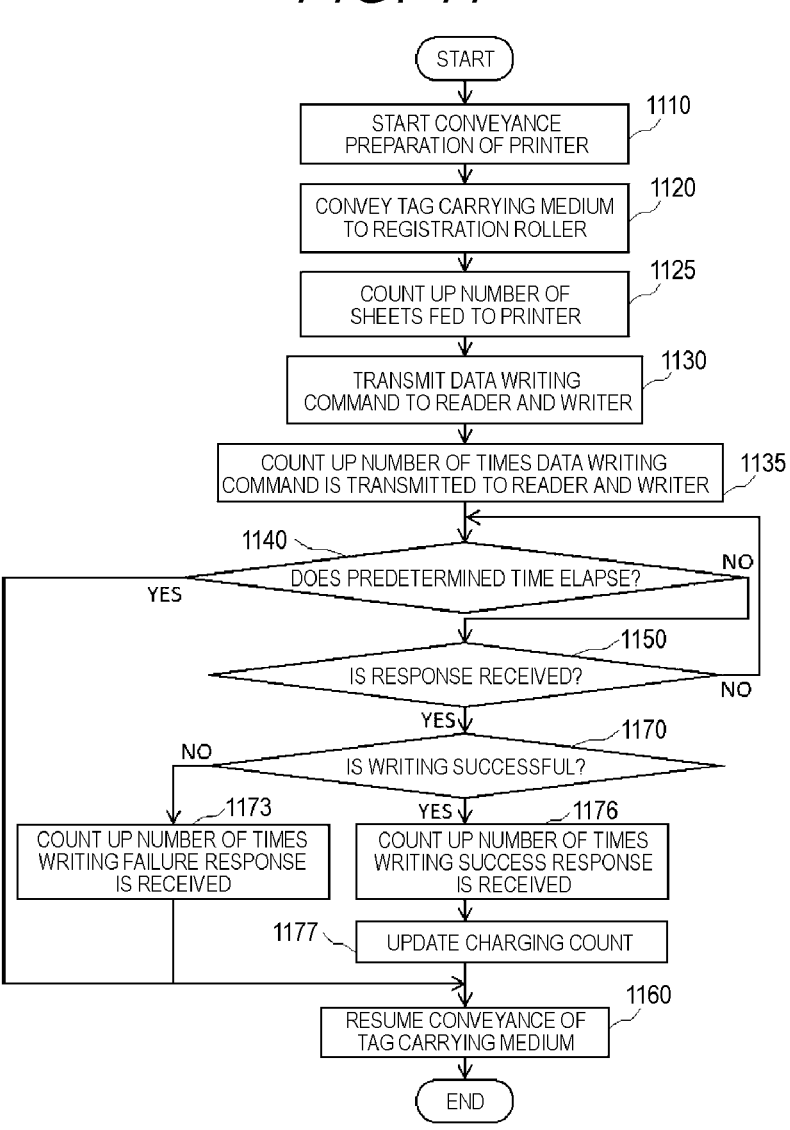
FIG. 11 is a flowchart illustrating a processing by a processor of an image forming apparatus of a wireless tag writing job without printing.

FIG. 11 is a flowchart illustrating a process by the processor 151 of the image forming apparatus 100 for a wireless tag writing job without any printing. The functions of the image forming apparatus 100 are implemented by causing the processor 151 to execute a program stored in the ROM 152, the auxiliary storage device 154, or the like.

For example, the processor 151 receives a wireless tag writing job via the communication interface 155 and starts the process of FIG. 11. In other examples, the processor 151 receives a wireless tag writing execution operation instruction from the operational panel 104 and starts the process of FIG. 11.

The processor 151 causes the printer 101 to start conveyance preparation (ACT 1110). The start of the conveyance preparation is, for example, starting rotation of the transfer belt 117 and the secondary transfer rollers 118, starting rotation of the fixing unit 119, or the like.

After the printer 101 is caused to perform the conveyance preparation, the processor 151 causes the sheet feed roller 123 to carry out the tag carrying medium 200 from the sheet feed tray 111 and then causes the registration roller 124 to temporarily stop the tag carrying medium 200 (ACT 1120). The processor 151 counts up the number of sheets fed to the printer 101 (ACT 1125).

After tag carrying medium 200 is temporarily stopped by the registration roller 124, the processor 151 transmits a data writing command to the reader and writer 103 via the serial interface 105 to give an instruction for writing of data to the wireless tag 202 (ACT 1030) and waits until a predetermined amount of time elapses (ACT 1140) or a response is received from the reader and writer 103 (ACT 1150). The processor 151 tracks the number of times the data writing command is transmitted to the reader and writer 103 (ACT 1135).

When the predetermined amount of time elapses without a response (NO in ACT 1140), the processor 151 resumes the conveyance of the tag carrying medium 200 that was temporarily stopped by the registration roller 124 (ACT 1160). No printing is performed on the tag carrying medium 200. The tag carrying medium 200 passes through the fixing unit 119 and is discharged to the sheet discharge tray 121.

When a response indicating that the tag writing failed is received (YES in ACT 1150 followed by NO in ACT 1170), the processor 151 tracks the number of times the response indicating that the writing fails is received (ACT 1173), and resumes the conveyance of the tag carrying medium 200 temporarily stopped by the registration roller 124 (ACT 1160). A tag carrying medium 200 on which an image is not formed passes through the fixing unit 119 and is discharged to the sheet discharge tray 121.

When a response indicating that the tag writing was successful is received (YES in ACT 1150 followed by YES in ACT 1170), the processor 151 increases the value for the number of times the response indicating the writing was successful has been received from the reader and writer 103 (ACT 1176), updates the charging count (ACT 1177), and resumes the conveyance of the tag carrying medium 200 temporarily stopped by the registration roller 124 (ACT 1160). The tag carrying medium 200 on which an image is not formed passes through the fixing unit 119 and is discharged to the sheet discharge tray 121.

Since the printer 101 is prohibited from forming an image by the image forming permission signal (or lack thereof), a count-up event does not occur. Since an image is not formed on the tag carrying medium 200, the processor 151 does not count up the number of success pages.

FIG. 12 is a table illustrating counting and charging for different processes of the image forming apparatus 100 when the charging count is set to be used as the primary charging basis.

As a charging amount for the process per print medium, color printing is set to ¥20 per page, monochromic printing is set to ¥10 per page, and the wireless tag writing is set to ¥5 per page. A charging amount for a successful wireless tag writing and printing process is set to be the sum of the charging amount for color printing (or monochromic printing) and the charging amount for a wireless tag writing.

In charging for color printing, an amount of money obtained by multiplying the charging count increase value for color printing by a fixed unit price is charged. Similarly, for monochromic printing, an amount of money obtained by multiplying the charging count increase value for monochromic printing by the fixed unit price is charged. For either color printing or monochromic printing, there is no charging when the printer 101 does not notify the processor 151 of occurrence of a count-up event.

For a wireless tag writing process, an amount of money obtained by multiplying the charging count increase value for a successful tag data writing by the fixed unit price is charged. For a tag data writing failure, there is no charge. When the number of times the data writing command is transmitted (which includes the number of data writing successes and the number of data writing failures) is used as a charging basis for the wireless tag writing process, there may be a problem that charging occurs even when the tag data writing fails. In the present embodiment, since the charging basis for the wireless tag writing process is the increase in the charging count for a tag data writing success, the problem is avoided.

In some examples, for a tag data writing failure, the charging count may be increased by less than for a tag data writing success. That is, even when the wireless tag writing fails, it is still possible to charge for consumption related to the rotating sheet feed roller 123, transfer belt 117, secondary transfer rollers 118, fixing unit 119, or sheet discharge roller 122 of the image forming apparatus 100, or the like.

In charging for the wireless tag writing and printing process, the amount obtained by multiplying the charging count increase for color printing by the fixed unit price or the amount count obtained by multiplying the charging increase for monochromic printing by the fixed unit price can be added to the amount obtained by multiplying the charging count increase for a tag data writing success by the fixed unit price. In the present embodiment, when the wireless tag writing fails even though the printing was successful, there is no charge to the user. Therefore, it is possible to solve a problem that a charge is made even though the wireless tag writing fails.

FIG. 13 is a table illustrating counting and charging for different processes of the image forming apparatus 100 when the number of success pages is set to be the primary charging basis.

As a charging amount for each process on a per print medium basis, color printing is set to ¥20 per page (medium), monochromic printing is set to ¥10 per page, and wireless tag writing is set to ¥5 per page. The charging amount for a successful wireless tag writing and printing process is of the sum the charge for the color printing (or the monochromic printing) and the charge for the wireless tag writing.

For color printing, the number of color success pages is multiplied by the per page charging amount for the color printing. For monochromic printing, the number of monochromic success pages is multiplied by the per page charging amount for the monochromic printing. The number of pages for which an error (so-called jam) or the like occurs due to a mechanical error related to a fed sheet or image forming otherwise does not occur is not included in the charging.

In some examples, for color printing, the number of color failure pages may be multiplied by a per page amount that is less than for successful color printing. Thus, it is possible to charge for consumption related to the rotating sheet feed roller 123, transfer belt 117, secondary transfer rollers 118, fixing unit 119, or sheet discharge roller 122 of the image forming apparatus 100, even in a failed color printing thereby solving the problem of unaccounted for use.

Similarly, for monochromic printing, failed printings may be charged at a lower per page amount than for successful printings.

For the wireless tag writing process, the number of data writing successes may be multiplied by the per page charging amount for wireless tag writing. The tag data writing failures are not charged. When the number of times the data writing command is transmitted (which includes the number of data writing successes and the number of data writing failures) is set as a charging basis for the wireless tag writing process, there is a problem that charging is made even when the tag data writing fails for the wireless tag. In the present embodiment, since the charging basis for the wireless tag writing process is the number of data writing successes, the problem is avoided.

In other examples, the charge for the wireless tag writing process may include charges for tag data writing failures though this can be for an amount less than for successful wireless tag writings. Thus, even when a wireless tag writing fails, it is possible to charge for consumption related to the rotating sheet feed roller 123, transfer belt 117, secondary transfer rollers 118, fixing unit 119, or sheet discharge roller 122 of the image forming apparatus 100, thereby solving the problem of uncompensated usage.

In charging for a wireless tag writing and printing process, the charge may be the combined sum due for successful printing (color and/or monochrome) and successful tag writing. In the present embodiment, when the wireless tag writing fails but the printing is successful, for the charge due for the printing process may be charged without charging for the (failed) wireless tag writing. It is thus possible to solve a problem that may occur when a user actually only wanting a printing process causes a tag data writing failure intentionally to avoid any printing charges. In the present embodiment, when the wireless tag writing is successful even though the printing fails, the charging amount for a wireless tag writing process can be charged to the user. Therefore, it is possible to avoid a problem of a user wanting only a tag writing attempts to avoid use charges by intentionally jamming a page after the wireless tag writing.

For a wireless tag writing and printing process, money can be charged based on the number of color failure pages, the number of monochromatic failure pages, and/or the number of tag data writing failures. Generally, the charge for failures would be less than for successes, but, in any event, it is possible to charge for consumption related to the rotating sheet feed roller 123, transfer belt 117, secondary transfer rollers 118, fixing unit 119, or sheet discharge roller 1 the image forming apparatus 100, thereby solving the problem of uncompensated use.

Figure 14:
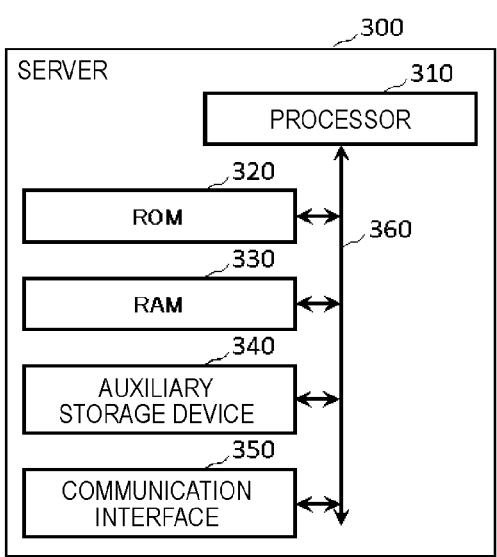
FIG. 14 is a block diagram illustrating a server.

FIG. 14 is a block diagram illustrating a server 300 implemented as a single computer apparatus. The server 300 includes a processor 310, a read-only memory (ROM) 320, a random access memory (RAM) 330, an auxiliary storage device 340, and a communication interface 350. These units are connected to each other via a bus 360 or the like.

The processor 310 corresponds to a central part of a computer that performs a process such as calculation and control necessary for an operation of the server 300. The processor 310 controls each sub-unit such that various functions of the server 300 are implemented based on programs such as firmware, system software, and application software stored in the ROM 320, the auxiliary storage device 340, or the like. The processor 310 performs processes based on the programs. All or some of the programs may be embedded as circuitry of the processor 310. The processor 310 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), or the like. Alternatively, the processor 310 is a combination of several of these.

The ROM 320 is a nonvolatile memory. The ROM 320 stores, for example, firmware or the like among the above-described programs. The ROM 320 stores data or the like used for the processor 310 to perform various processes.

The RAM 330 corresponds to a main storage device of a computer that has the processor 310 as a central part. The RAM 330 is a memory used to read or write data. The RAM 330 is used as a work area where data temporarily used for the processor 310 to perform various processes is stored. The RAM 330 is typically a volatile memory.

The auxiliary storage device 340 is, for example, an electric erasable programmable read-only memory (EEPROM), a hard disk drive (HDD), a flash memory, or the like. The auxiliary storage device 340 stores, for example, system software, application software, or the like among the above-described programs. The auxiliary storage device 340 stores data used for the processor 310 to perform various processes, data generated by the processes performed by the processor 310, various set values, and the like.

The communication interface 350 is for the server 300 to perform communication via a network such as the intra-network 500 or the wide area network 600.

The bus 360 includes a control bus, an address bus, and a data bus and transmits a signal transmitted or received in each sub-unit of the server 300.

The processor 310 stores each count value received via the communication interface 350 from the image forming apparatus 100 as part of data indicating an operation situation of the image forming apparatus 100. The received count values can be stored in the RAM 330 or the auxiliary storage device 340. The processor 310 determines whether it is necessary to inspect or repair each image forming apparatus 100 based on the data indicating the operation situation of the image forming apparatus 100. When there is the image forming apparatus 100 which requires inspection or repair, the processor 310 can direct a serviceperson to inspect or repair the image forming apparatus 100 by transmitting information for identifying the image forming apparatus 100 to the serviceperson terminal 400 via the communication interface 350.

When the number of sheets fed to the image forming apparatus 100 exceeds a predetermined number of sheets, the processor 310 transmits information urging a maintenance checkup to the serviceperson terminal 400 and/or the image forming apparatus 100 via the communication interface 350.

In the present embodiment, since the number of sheets fed to the image forming apparatus 100 is counted and recorded irrespective of success or failure of the wireless tag writing, deterioration in the sheet feed roller 123, the transfer belt 117, the secondary transfer rollers 118, the fixing unit 119, or the sheet discharge roller 122 along the conveyance route of the print medium in the image forming apparatus 100 can be appropriately predicted and maintenance checkup can be urged without concern with the success or failure of the wireless tag writing in the image forming apparatus 100.

When the number of times the photosensitive drum 1151Y of the image forming apparatus 100 is rotated exceeds a predetermined number of times, the processor 310 transmits information for urging a maintenance checkup of the photosensitive drum 1151Y or the image forming unit 115Y to the serviceperson terminal 400 or the image forming apparatus 100 via the communication interface 350.

When the number of times the photosensitive drum 1151M of the image forming apparatus 100 is rotated exceeds a predetermined number of times, the processor 310 transmits information for urging a maintenance checkup of the photosensitive drum 1151M or the image forming unit 115M to the serviceperson terminal 400 or the image forming apparatus 100 via the communication interface 350.

When the number of times the photosensitive drum 1151C of the image forming apparatus 100 is rotated exceeds a predetermined number of times, the processor 310 transmits information for urging a maintenance checkup of the photosensitive drum 1151C or the image forming unit 115C to the serviceperson terminal 400 or the image forming apparatus 100 via the communication interface 350.

When the number of times the photosensitive drum 1151K of the image forming apparatus 100 is rotated exceeds a predetermined number of times, the processor 310 transmits information for urging a maintenance checkup of the photosensitive drum 1151K or the image forming unit 115K to the serviceperson terminal 400 or the image forming apparatus 100 via the communication interface 350.

In the present embodiment, since the number of times each photosensitive drum 1151 (1151Y, 1151M, 1151C, and 1151K) of the image forming apparatus 100 is rotated is counted and recorded for each photosensitive drum 1151 (1151Y, 1151M, 1151C, and 1151K) irrespective of success or failure of the wireless tag writing of the image forming apparatus 100, deterioration in each photosensitive drum 1151 (1151Y, 1151M, 1151C, and 1151K) can be appropriately predicted and maintenance checkup can be urged without concern with the success or failure of the wireless tag writing in the image forming apparatus 100.

When the total number of light emitting pixels of laser emitted to the photosensitive drum 1151Y of the image forming apparatus 100 exceeds a predetermined number, the processor 310 transmits information for urging a maintenance checkup of the photosensitive drum 1151Y to the serviceperson terminal 400 or the image forming apparatus 100 via the communication interface 350.

When the total number of light emitting pixels of laser emitted to the photosensitive drum 1151M of the image forming apparatus 100 exceeds a predetermined number, the processor 310 transmits information for urging a maintenance checkup of the photosensitive drum 1151M to the serviceperson terminal 400 or the image forming apparatus 100 via the communication interface 350.

When the total number of light emitting pixels of laser emitted to the photosensitive drum 1151C of the image forming apparatus 100 exceeds a predetermined number, the processor 310 transmits information for urging a maintenance checkup of the photosensitive drum 1151C to the serviceperson terminal 400 or the image forming apparatus 100 via the communication interface 350.

When the total number of light emitting pixels of laser emitted to the photosensitive drum 1151K of the image forming apparatus 100 exceeds a predetermined number, the processor 310 transmits information for urging a maintenance checkup of the photosensitive drum 1151K to the serviceperson terminal 400 or the image forming apparatus 100 via the communication interface 350.

In the present embodiment, since the total number of light emitting pixels of laser for each color unit is recorded irrespective of success or failure of the wireless tag writing of the image forming apparatus 100, deterioration in each photosensitive drum 1151 (1151Y, 1151M, 1151C, and 1151K) of the image forming apparatus 100 can be appropriately predicted and maintenance checkup can be urged without consideration of the success or failure of the wireless tag writing of the image forming apparatus 100.

The processor 310 can calculate a charge amount by multiplying a charging count increase for color printing as received from the forming image apparatus 100 via the communication interface 350 by a unit price. The processor 310 similarly calculates a charge amount for monochromic printing. The processor 310 also calculates a charge amount by multiplying a charging count increase for tag data writing success as received from the image forming apparatus 100 via the communication interface 350 by a unit price. The processor 151 may calculate a charge amount by multiplying the number of color success pages by a color printing unit price. The processor 151 may calculate a charge amount by multiplying the number of monochromic success pages by a monochromic printing unit price. The processor 310 may calculate a charge amount by multiplying the number of color input pages, the number of monochromic input pages, the number of fed sheets, the number of times the data writing command is transmitted, or the number of data writing failures as received from the image forming apparatus 100 via the communication interface 350 by respectively corresponding unit prices.

The processor 310 transmits information indicating the charging count change (increase) and the unit price for color printing along with the calculated charge amount to the user terminal 106 or the image forming apparatus 100 via the communication interface 350. The processor 310 similarly transmits the charging count changes, the unit prices, and the calculated charge amounts for the monochromic printing or other process to the user terminal 106 or the image forming apparatus 100 via the communication interface 350. The calculated charge amounts for the various processes are calculated on other bases may be transmitted to the user terminal 106 or the image forming apparatus 100 via the communication interface 350 along with additional relevant information regarding the charge calculation. For example, the processor 310 may transmit the number of color success pages, the color printing unit price, the number of monochromic success pages, the monochromic printing unit price, the number of color input pages, the number of monochromic input pages, the number of fed sheets, the number of times the data writing command is transmitted, the number of writing failures, differing unit prices, and the like.

Figure 15:
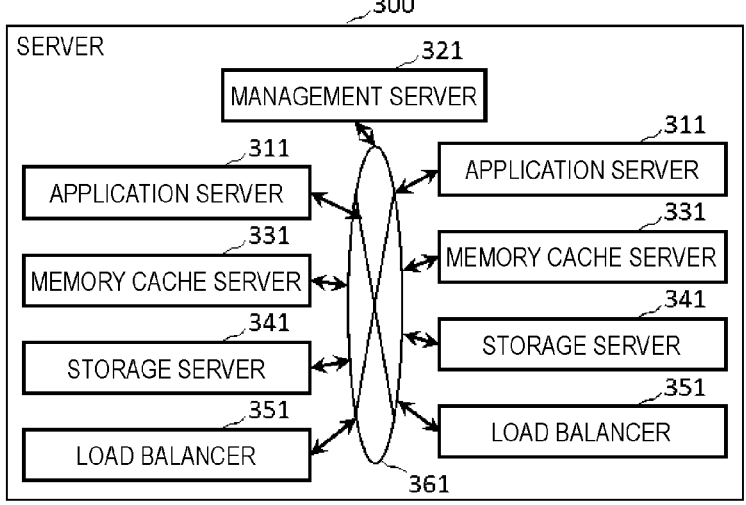
FIG. 15 is a block diagram illustrating additional aspects of a server.

FIG. 15 is a block diagram illustrating a server 300 implemented as a so-called cloud server. The server 300 in this example includes application servers 311, a management server 321, memory cache servers 331, storage servers 341, and load balancers 351. A network 361 is connected to these different units.

The application server 311 performs a calculation process necessary for an operation of the server 300.

The memory cache server 331 has a role of data cache for the calculation process of the application server 311. The memory cache server 331 is used as a work area or the like where data temporarily used for the application server 311 to perform various processes is stored.

The storage server 341 stores a result of the calculation process of the application server 311 temporarily stored by the memory cache server 331 for a long time. The storage server 341 stores data used for the application server 311 to perform various processes, data and various setting values generated by the processes performed by the application server 311, and the like. The memory cache server 331 receives data, various setting values, and the like from the storage server 341 and transmits the data, the various setting values, and the like to the application server 311.

The load balancer 351 is an interface that allows the server 300 to perform communication via the network 361. The load balancer 351 schedules which application server 311 performs calculation, which memory cache server 331 supports the calculation by the application server 311, and which storage server 341 stores the result depending on an operation situation of the application servers 311, the memory cache servers 331, or the storage servers 341.

The management server 321 monitors whether the application servers 311, the memory cache servers 331, the storage servers 341, and the load balancers 351 are operating normally.

The application server 311, the management server 321, the memory cache server 331, the storage server 341, and the load balancer 351 perform communication via the network 361.

The load balancer 351 stores each count value received from the image forming apparatus 100 as part of data indicating an operation situation of the image forming apparatus 100 in the storage server 341. The application server 311 determines whether it is necessary to inspect or repair each image forming apparatus 100 based on the data indicating the operation situation of the image forming apparatus 100. When there is an image forming apparatus 100 which requires inspection or repair, the application server 311 can direct a serviceperson to inspect or repair the image forming apparatus 100 by transmitting information for identifying the image forming apparatus 100 to the serviceperson terminal 400 via the load balancer 351.

When the number of sheets fed to the image forming apparatus 100 exceeds a predetermined number, the application server 311 transmits information for urging a maintenance checkup to the serviceperson terminal 400 or the image forming apparatus 100 via the load balancer 351.

In the present embodiment, since the number of sheets fed to the image forming apparatus 100 is counted and recorded irrespective of success or failure of the wireless tag writing, deterioration in the sheet feed roller 123, the transfer belt 117, the secondary transfer rollers 118, the fixing unit 119, or the sheet discharge roller 122 in the conveyance route of the print medium of the image forming apparatus 100 can be appropriately predicted and a maintenance checkup can be urged without consideration of success or failure of the wireless tag writing of the image forming apparatus 100.

When the number of times the photosensitive drum 1151Y of the image forming apparatus 100 is rotated exceeds a predetermined number of times, the application server 311 transmits information for urging a maintenance checkup of the photosensitive drum 1151Y or the image forming unit 115Y to the serviceperson terminal 400 or the image forming apparatus 100 via the load balancer 351.

When the number of times the photosensitive drum 1151M of the image forming apparatus 100 is rotated exceeds a predetermined number of times, the application server 311 transmits information for urging a maintenance checkup of the photosensitive drum 1151M or the image forming unit 115M to the serviceperson terminal 400 or the image forming apparatus 100 via the load balancer 351.

When the number of times the photosensitive drum 1151C of the image forming apparatus 100 is rotated exceeds a predetermined number of times, the application server 311 transmits information for urging a maintenance checkup of the photosensitive drum 1151C or the image forming unit 115C to the serviceperson terminal 400 or the image forming apparatus 100 via the load balancer 351.

When the number of times the photosensitive drum 1151K of the image forming apparatus 100 is rotated exceeds a predetermined number of times, the application server 311 transmits information for urging a maintenance checkup of the photosensitive drum 1151K or the image forming unit 115K to the serviceperson terminal 400 or the image forming apparatus 100 via the load balancer 351.

In the present embodiment, since the number of times each photosensitive drum 1151 (1151Y, 1151M, 1151C, and 1151K) of the image forming apparatus 100 is rotated is counted and recorded for each photosensitive drum 1151 (1151Y, 1151M, 1151C, and 1151K) irrespective of success or failure of the wireless tag writing of the image forming apparatus 100, deterioration in each photosensitive drum 1151 (1151Y, 1151M, 1151C, and 1151K) can be appropriately predicted and a maintenance checkup can be urged without influence of the success or failure of the wireless tag writing of the image forming apparatus 100 being considered.

When the total number of light emitting pixels of laser emitted to the photosensitive drum 1151Y of the image forming apparatus 100 exceeds a predetermined number, the application server 311 transmits information for urging a maintenance checkup of the photosensitive drum 1151Y to the serviceperson terminal 400 or the image forming apparatus 100 via the load balancer 351.

When the total number of light emitting pixels of laser emitted to the photosensitive drum 1151M of the image forming apparatus 100 exceeds a predetermined number, the application server 311 transmits information for urging a maintenance checkup of the photosensitive drum 1151M to the serviceperson terminal 400 or the image forming apparatus 100 via the load balancer 351.

When the total number of light emitting pixels of laser emitted to the photosensitive drum 1151C of the image forming apparatus 100 exceeds a predetermined number, the application server 311 transmits information for urging a maintenance checkup of the photosensitive drum 1151C to the serviceperson terminal 400 or the image forming apparatus 100 via the load balancer 351.

When the total number of light emitting pixels of laser emitted to the photosensitive drum 1151K of the image forming apparatus 100 exceeds a predetermined number, the application server 311 transmits information for urging a maintenance checkup of the photosensitive drum 1151K to the serviceperson terminal 400 or the image forming apparatus 100 via the load balancer 351.

In the present embodiment, since the total number of light emitting pixels of laser for each color of image forming by the image forming apparatus 100 is recorded irrespective of success or failure of the wireless tag writing of the image forming apparatus 100, deterioration in each photosensitive drum 1151 (1151Y, 1151M, 1151C, and 1151K) of the image forming apparatus 100 can be appropriately predicted and a maintenance checkup can be urged without influence of the success or failure of the wireless tag writing of the image forming apparatus 100 being considered.

The application server 311 calculates a charging amount by multiplying a charging count increase for color printing by a unit price. The application server 311 similarly calculates a charge amount for monochromic printing and tag data writing success. In other examples, the application server

311 may calculate a charge amount by multiplying the number of color success pages by a color printing unit price. The application server 311 may similarly calculate a charging amount for monochromatic printing. In other examples, the application server 311 may calculate a charge amount by multiplying the number of color input pages, the number of monochromic input pages, the number of fed sheets, the number of times the data writing command is transmitted, or the number of data writing failures by respectively corresponding unit prices.

The application server 311 transmits the charging count and the unit price for the color printing along with the calculated charging amount to the user terminal 106 or the image forming apparatus 100 via the load balancer 351. The application server 311 may similarly transmit information related to a monochromic printing and tag data writing successes to the user terminal 106 or the image forming apparatus 100 via the load balancer 351. Likewise, the application server 311 may transmit the number of color success pages, the color printing unit price, and the calculated charging amount to the user terminal 106 or the image forming apparatus 100 via the load balancer 351. The application server 311 may transmit the number of monochromic success pages, the monochromic printing unit price, and the calculated charging amount to the user terminal 106 or the image forming apparatus 100 via the load balancer 351. The application server 311 may transmit the number of color input pages, the number of monochromic input pages, the number of fed sheets, the number of times the data writing command is transmitted, the number of data writing failures, the respectively corresponding unit prices, and the calculated charging amount to the user terminal 106 or the image forming apparatus 100 via the load balancer 351.

In general, each device in an embodiment may be transferred with a program for executing each of the above-described processes already stored in the device. Alternatively, each device may be transferred without a program already stored therein and the program may be separately transferred. The transferring of the program(s) can be implemented, for example, by using a removable storage medium such as a disc medium or a semiconductor memory device or by downloading the program(s) via a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
   a tag communication unit configured to communicate with wireless tags;
   an image forming unit configured to form image on media carrying wireless tags; and
   a processor configured to:
   permit the image forming unit to form an image on a medium when the tag communication unit successfully writes data to a wireless tag carried by the medium, and indicate the image formed on the medium by the image forming unit is a use charge target after the image forming unit is permitted to form the image on the medium.

2. The image forming apparatus according to claim 1, wherein the image forming unit includes a registration roller that temporarily stops the medium before forming the image on the medium, and the tag communication unit is positioned to communicate with the wireless tag of the medium stopped at the registration roller.

3. The image forming apparatus according to claim 1, wherein the processor is further configured to:

indicate the image formed on the medium is the use charge target by increasing a charging count value when the tag communication unit successfully writes the data, and calculate a user charge amount according to a charging count.

4. The image forming apparatus according to claim 3, wherein the processor is further configured to:

permit the image forming unit to form the image on the medium when the tag communication unit fails to write the data to the wireless tag carried by the medium, but indicates the image formed on the medium is the use charge target by increasing the charging count value by a different amount than when the tag communication unit successfully writes the data to the wireless tag carried by the medium.

5. The image forming apparatus according to claim 1, wherein the processor is further configured to receive a counted number of pixels for the image formed on the medium by the image forming unit.

6. The image forming apparatus according to claim 5, wherein, when the counted number of pixels is less than a threshold number, the processor sets the medium on which the image was formed to a no use charge target.

7. The image forming apparatus according to claim 1, wherein, whether the tag communication unit successfully writes data to the wireless tag or fails to write data to the wireless tag, the processor counts the medium carrying the wireless tag in a total number of sheets fed to the image forming unit.

8. A server for a print system including image forming apparatus with a tag communication unit that communicates with a wireless tag and an image forming unit that forms an image on a medium carrying the wireless tag, the server comprising:

a communication interface connected to the image form- ing apparatus and configured to receive a number of sheets printed by the image forming unit; and a storage unit configured to store, as a use charging subject, the received number of sheets, wherein the image forming apparatus includes:

a processor configured to:

permit the image forming unit to form an image on a sheet when the tag communication unit successfully writes data to a wireless tag carried by the sheet, and indicate the image formed on the sheet by the image forming unit is a use charge target after the image forming unit is permitted to form the image on the sheet.

9. The server according to claim 8, wherein the processor is further configured to:

indicate the image formed on the sheet is the use charge target by increasing a charging count value when the tag communication unit successfully writes the data, and calculate a user charge amount according to a charging count.

10. The server according to claim 8, wherein the processor is further configured to:

permit the image forming unit to form the image on the sheet when the tag communication unit fails to write the data to the wireless tag carried by the sheet, but indicates the image formed on the sheet is the use charge target by increasing the charging count value by a different amount than when the tag communication unit successfully writes the data to the wireless tag carried by the sheet.

11. The server according to claim 8, wherein the processor is further configured to receive a counted number of pixels for the image formed on the sheet by the image forming unit.

12. The server according to claim 11, wherein, when the counted number of pixels is less than a threshold number, the processor sets the sheet on which the image was formed to a no use charge target.

13. The server according to claim 8, wherein, whether the tag communication unit successfully writes data to the wireless tag or fails to write data to the wireless tag, the processor counts the sheet carrying the wireless tag in a total number of sheets fed to the image forming unit.

14. The server according to claim 8, wherein the server is a cloud-based apparatus.

15. A multifunctional peripheral device system, compris- ing:

a tag reader/writer configured to write information to, and read information from, wireless tags;

a printer unit configured to form image on sheets carrying wireless tags;

a sheet conveyance mechanism to convey sheets along a conveyance path from a sheet fed location to a sheet discharge location; and a processor configured to:

control the sheet conveyance mechanism to move a sheet to a tag/reader writer communication position on the conveyance path before the sheet enters the printer unit, attempt to write data to a wireless tag on the sheet at the tag/reader writer communication position by control of the tag reader/writer, determine if the attempt to write data to the wireless tag was successful by control of the tag reader/writer to read data from the wireless tag while at the tag/ reader writer communication position, permit the printer unit to form an image on the sheet if the attempt was determined successful, and indicate the image formed on the sheet by the printer unit is a use charge target.

16. The multifunctional peripheral device system accord- ing to claim 15, wherein the printer unit includes a registration roller that tempo- rarily stops the sheet at the tag reader/writer commu- nication position.

17. The multifunctional peripheral device system accord- ing to claim 15, wherein the processor is further configured to:

indicate the image formed on the sheet is the use charge target by increasing a charging count value when the tag reader/writer successfully writes the data, and calculate a user charge amount according to a charging count.

18. The multifunctional peripheral device system according to claim 17, wherein the processor is further configured to:

permit the printer unit to form the image on the sheet when the tag reader/writer fails to write the data to the wireless tag carried by the sheet, but indicates the image formed on the sheet is the use charge target by increasing the charging count value by a lesser amount than when the tag reader/writer successfully writes the data to the wireless tag carried by the sheet.

19. The multifunctional peripheral device system according to claim 15, wherein the processor is further configured to receive a counted number of pixels for the image formed on the sheet by the printer unit, and when the counted number of pixels is less than a threshold number, the processor sets the sheet on which the image was formed to a no use charge target.

20. The multifunctional peripheral device system according to claim 15, further comprising:

a server communicatively connected to the processor, wherein whether the tag reader/writer successfully writes data to the wireless tag or fails to write data to the wireless tag, the processor counts the sheet carrying the wireless tag in a total number of sheets fed to the printer unit and transmits the total number of sheets to the server.

* * * * *